United States Patent [19]

Kucheck et al.

[11] 4,046,613

[45] Sept. 6, 1977

[54] MATRIX LABEL APPLICATOR

[75] Inventors: Leo Kucheck, Irvine; Michael Crankshaw, Sante Fe Springs, both of Calif.

[73] Assignee: Label-Aire Inc., Fullerton, Calif.

[21] Appl. No.: 664,966

[22] Filed: Mar. 8, 1976

[51] Int. Cl.[2] ........................ B32B 31/00; B29C 17/00

[52] U.S. Cl. .................................... 156/249; 156/285; 156/497; 156/361; 156/542; 156/364; 156/566; 156/366; 221/73; 221/211; 271/197; 271/235

[58] Field of Search ............... 156/249, 285, 344, 357, 156/361, 363, 364, 540, 366, 497, 542, 566, 569, 584, DIG. 38, 541, 384, DIG. 31, DIG. 33; 271/197, 235; 221/73, 211; 198/424, 459, 428, 460

[56] References Cited

U.S. PATENT DOCUMENTS

| | | | |
|---|---|---|---|
| 2,924,323 | 2/1960 | Holben | 198/34 |
| 3,025,211 | 3/1962 | Winn | 156/542 |
| 3,093,528 | 6/1963 | Reich | 156/285 |
| 3,483,059 | 12/1969 | Dinter | 156/285 |
| 3,562,067 | 2/1971 | Kucheck | 156/285 |
| 3,729,362 | 4/1973 | French et al. | 156/363 |

*Primary Examiner*—Charles E. Van Horn
*Assistant Examiner*—J. J. Gallagher
*Attorney, Agent, or Firm*—Gordon L. Peterson

[57] ABSTRACT

A movable conveyor belt having first and second belt surfaces and an opening extending between the belt surfaces, a mechanism for depositing a label on the first belt surface at a first station, and a pressure source for blowing air under pressure through the opening to transfer the label from the belt at a second station to at least one object.

27 Claims, 5 Drawing Figures

MATRIX LABEL APPLICATOR

BACKGROUND OF THE INVENTION

In a conventional labeling operation, articles to be labeled are conveyed single file through a labeling station. A label applicator at the labeling station applies a label to each article as such passes through the labeling station.

There are instances in which it is desirable to label articles which are arranged in side-by-side relationship on a conveyor. For example, some packaging equipment provides an output which includes side-by-side packages. There are also instances in which rows of containers in open top cartons must be labeled.

One way to label side-by-side articles is to employ a wide backing strip carrying side-by-side labels and a wide peeling bar to remove the side-by-side labels from the backing strip. Label applicators of this type are known. However, the wide backing strip wastes a large amount of paper especially when the labels are relatively small and the articles to be lableled are relatively large and/or widely spaced. Thus, this approach becomes more impractical as the overall combined width of the side-by-side articles to be labeled increases. In addition, this method of label application cannot utilize the standard single row of labels on a backing strip.

SUMMARY OF THE INVENTION

The present invention provides a label applicator which is particularly adapted for labeling articles arranged in side-by-side relationship. The label applicator of this invention uses labels arranged in a conventional manner in a single row on the backing strip and so no paper is wasted.

The environment in which the present invention is particularly adapted to operate includes a conveyor or other means for conveying articles to be labeled along parallel paths to a labeling station. The articles to be labeled do not pass single file through the labeling station, but rather pass through the labeling station in side-by-side relationship forming sets or columns.

In order to label the column of articles, the present invention provides for moving a plurality of labels arranged in a row along a label path at a labeling station. The axes of the row and the label path are generally parallel to each other and to the column. Thus, the labels and the articles can be brought into registry, and the labels can be transferred to the articles of the column.

Typically, the articles are moved in a first direction through the labeling station in multiple rows. The axes of the rows of labels and the label path are angularly related to the first direction, i.e. nonparallel to the first direction. In other words, the row of labels extends across the multiple rows of the articles, and preferably the axes of the row of labels and the label path are transverse to the first direction.

The labels can be advantageously transported along the label path by a conveyor belt. The labels are deposited in sequence on the belt at a depositing station and the belt moves the labels along the label path. The labels can be retained on the belt by differential fluid pressure. In order to accomplish this, the conveyor belt preferably includes opening means so that a subatmospheric pressure can be applied to the opening means to retain the labels against the belt. The opening means can also be used to enable air under pressure to be blown through the opening means to transfer the labels from the conveyor belt to the articles to be labeled.

Before a label is applied to an article, it must be properly positioned on the belt so that it is in registry with as associated article. This may be accomplished in whole or in part by snychronizing the movement of the article conveyor with the rate at which labels are deposited on the belt. In a preferred embodiment, such synchronization is employed to roughly position the labels on the belt. Fine positioning is obtained by positioning means which is extendible through the opening means of the belt to engage the labels and retain them in the desired position. Once the labels are engaged by the positioning means they slip on the belt while the belt continues to run. One advantage of vacuum retention means for holding the labels on the belt is that such means allows the labels to slip on the belt to allow the labels to be positioned correctly.

The invention, together with further features and advantages thereof, may best be understood by reference to the following description taken in conjunction with accompanying illustrative drawing.

DESCRIPTION OF THE PREFERRED EMBODIMENT

Figure 1:
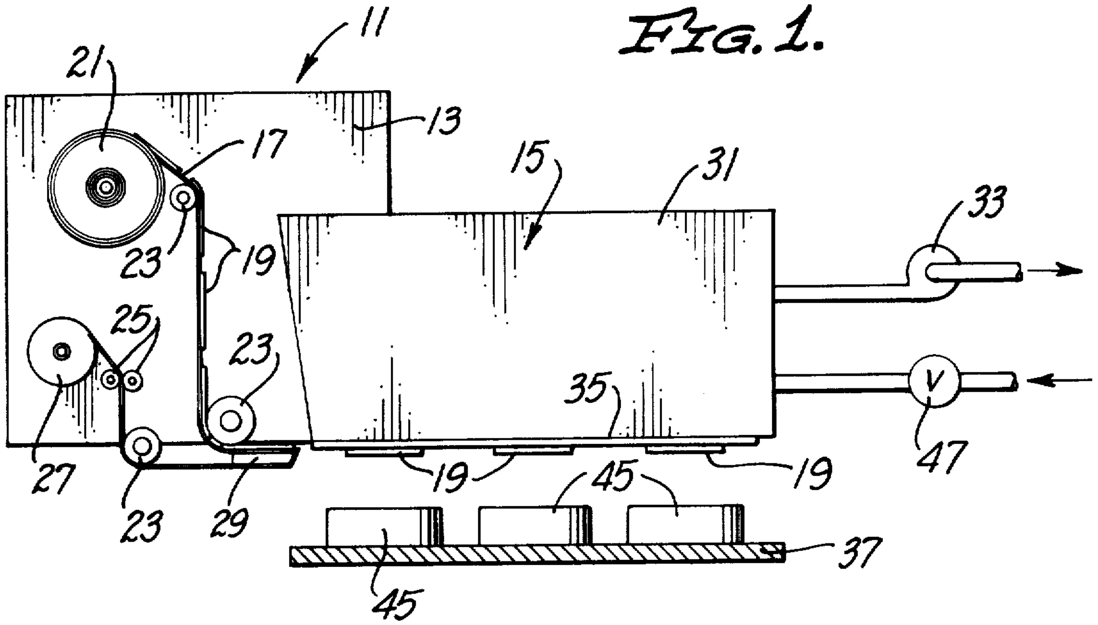
FIG. 1 is a partially schematic side elevational view of a label applicator constructed in accordance with the teachings of this invention suitably mounted in position above a conveyor for articles to be labeled.

FIG. 1 shows a label applicator 11 which generally includes a supporting structure 13 and a label transport 15 mounted on the supporting structure. A web or backing strip 17 carrying adhesive labels 19 in the usual manner is wound on a supply reel 21 which in turn is rotatably mounted on the supporting structure 13 or on another structure (not shown), if desired. The backing strip 17 extends over a plurality of guide rollers 23 and between drive rollers 25 to a take-up reel 27. The drive rollers 25 include one pinch roller and one power roller. The drive rollers 25 are driven by an electric motor (not shown) through a clutch and brake as is conventional in the label applicating field. A peeling bar 29 is suitably mounted on the supporting structure 13, and the web 17 extends over the peeling bar.

The label transport 15 includes a housing 31 which is adapted to contain air at less than atmospheric pressure which may be provided by a suitable vacuum source such as a vacuum pump 33. The housing 31 is substantially sealed except for the lower end thereof which is gas pervious. As described more fully hereinbelow, a conveyor belt or label transport belt 35 is mounted for movement along the bottom of the housing 31.

Movement of the web 17 across the peeling bar 29 sequentially removes the labels 19 and deposits them at a depositing station on the conveyor belt 35. The labels are releasably retained on the conveyor belt 35 as described more particularly hereinbelow by the vacuum pressure within the housing 31. As the labels 19 are deposited on the conveyor belt 35, they are moved along a label path in the direction of the arrow A in FIG. 2. The labels 19 on the conveyor belt 35 are arranged in a row, the axis of which coincides with the axis of the label path.

Figure 2:
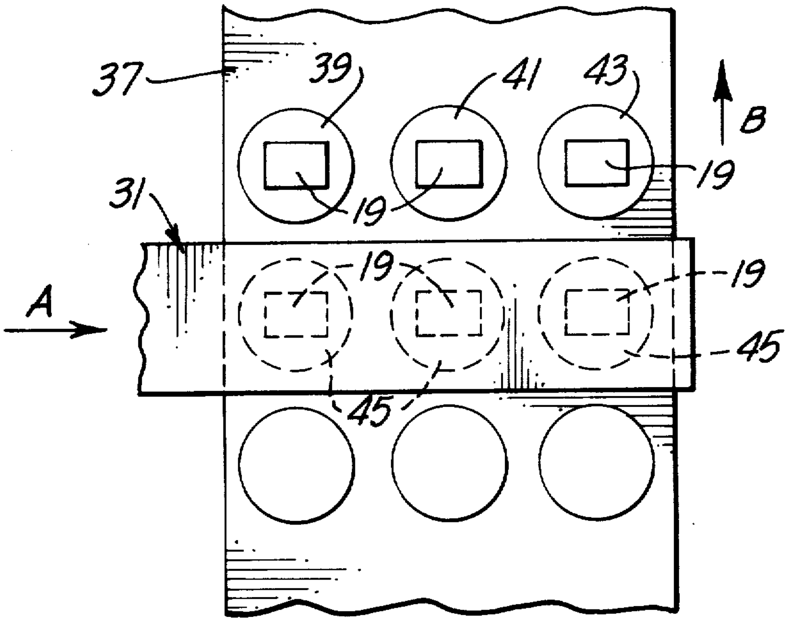
FIG. 2 is a fragmentary plan view of the construction shown in FIG. 1.

As shown in FIGS. 1 and 2, the label path extends above a conveyor 37 for three rows 39, 41 and 43 of articles 45. The conveyor 37, which may be of any construction suitable for moving articles to be labeled through a labeling station, moves the rows 39, 41 and 43 along spaced parallel paths in the direction of the arrow B in FIG. 2. Although three rows of the articles 45 are shown on the coneyor 37, this is purely illustrative, and any desired number of rows of articles may be labeled with the label applicator 11. In the embodiment illustrated, the direction of movement of the articles is transverse to the direction of movement of the labels 19 on the belt 35.

As shown by way of example in FIG. 2, the articles 45 of the rows 39, 41, and 43 are arranged in side-by-side relationship with the articles 45 beneath the conveyor belt 35, i.e. the articles at the labeling station, forming a set or column of articles. The axis of the column of articles 45 is parallel to the axes of the row of labels 19 on the conveyor belt 35 and to the axis of movement of the labels 19 on the conveyor belt.

As the articles 45 come into registry with the labels 19, the labels 19 on the conveyor belt 35 are transferred to the articles 45, respectively. This transferring can be advantageously carried out utilizing air at greater than atmospheric pressure obtained from suitable pressure source (not shown) through a valve, such as a solenoid valve 47. The articles 45 of a column may be labeled sequentially or simultaneously.

Figure 3:
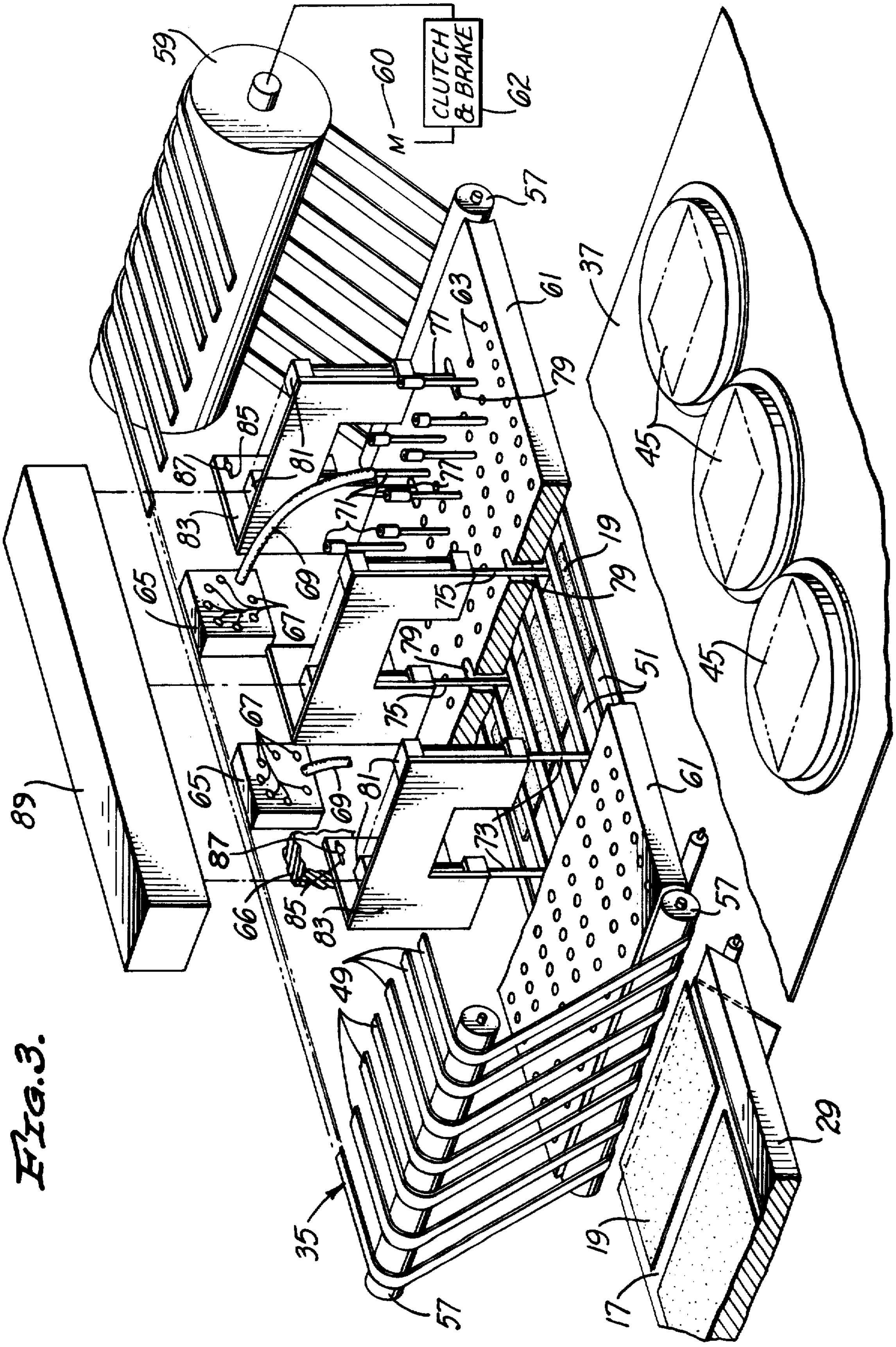
FIG. 3 is a perspective view with parts broken away of a portion of the label applicator and the article conveyor.
Figure 4:
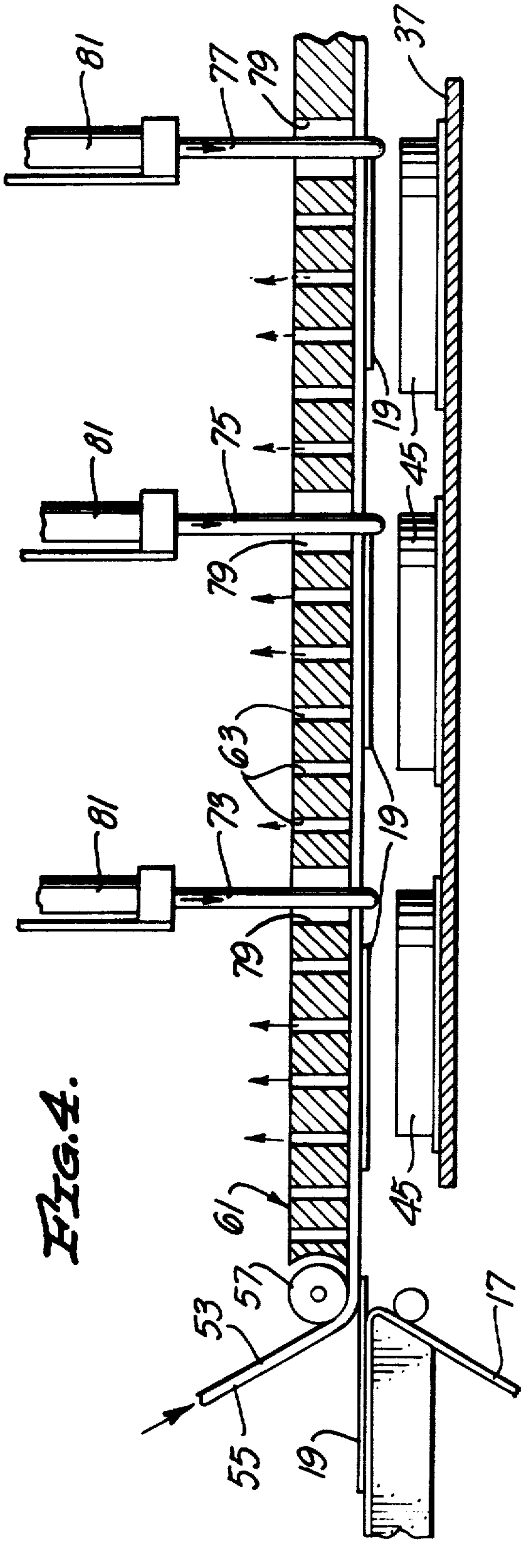
FIG. 4 is a somewhat schematic fragmentary sectional view of a portion of the label applicator with the labels being positioned above the articles to be labeled.
Figure 5:
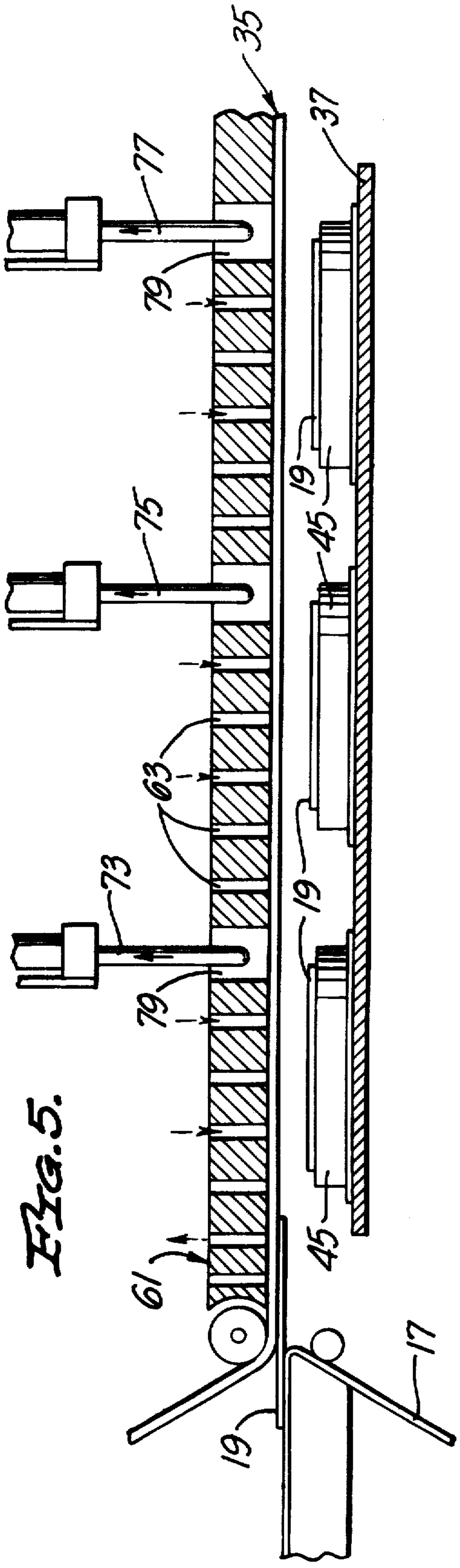
FIG. 5 is a sectional view similar to FIG. 3 after the articles have been labeled and with the positioning pins withdrawn to the unactuated position.

FIGS. 3–5 show a preferred construction for the label transport 15. In some respects the label transport 15 is similar to conventional vacuum belt transports. In FIG. 3, the housing 31 has been broken away to expose the interior of the label transport 15.

In the embodiment illustrated, the conveyor belt 35 is an endless belt and comprises a plurality of endless flexible conveyor strips or belts 49. Adjacent strips 49 are spaced apart to define opening means in the form of elongated slots 51. The conveyor belt 35 has an interior belt surface 53 (FIG. 4) and an exterior belt surface 55 (FIG. 4).

The belt 35 is mounted for movement by a plurality (three being illustrated) of idler rollers 57 and a drive roller 59 each of which is suitably rotatably mounted on the housing 31. The drive roller 59 is driven by a suitable motor 60 through a clutch and brake unit 62. In the embodiment illustrated, the rollers 57 and 59 are arranged at four corners of a trapezoid and this allows the belt 35 to surround other important structure of the label transport 15; however, obviously other configurations can be utilized.

A plate 61 is suitably mounted on the remainder of the housing 31 and forms a bottom wall for the housing. The plate 61 has a plurality of apertures 63 extending therethrough with the apertures being in registry with the slots 51. The plate 61 is continuous and unbroken and is shown broken away in FIG. 3 to expose other portions of the transport 15.

Various different arrangements can be used to selectively provide air under pressure for removing the labels 19 from the conveyor belt 35, and the arrangement shown is merely illustrative. As shown in FIG. 3, two air manifolds 65 are mounted on a back wall 66 of the housing 31. Each of the manifolds 65 is of identical construction and has a plurality of ports 67, each of which is adapted for connection to one end of a flexible tube 69. The other end of each of the flexible tubes 69 is coupled to a rigid tube 71. The other end of the rigid tubes 71 can be slidably received within any of the apertures 63. When the valve 47 (FIG. 1) is opened, fluid under pressure flows from the valve 47 through the manifolds 65, the ports 67, the associated flexible tubes 69, the rigid tubes 71, the apertures 63, and the slots 51 to the exterior of the label transport 15. The pattern of the air blast can be selected by inserting the rigid tube 71 into selected ones of the apertures 63. The manifold and tube construction shown herein may be similar or identical to the construction shown in common assignee's U.S. Pat. No. 3,885,705.

The present invention also provides means for positively and accurately positioning the labels 19 on the conveyor belt 35 so that the labels will be in the correct positions to be applied to the articles 45 therebelow. Although various positioning arrangements and devices can be used, the present invention positions the labels 19 on the conveyor belt 35 in two ways. First, during the time that the labels 19 are being deposited on the belt 51 and being positioned, the movement on the conveyor belt 35 is continuous, and the movement of the backing strip 17 over the peeling bar 29 is intermittent. Intermittent movement of the backing strip 17 can be accomplished by appropriately starting and stopping the drive rollers 25 in a manner well known in the labeling applicating art. By properly relating the speed of movement of the conveyor belt 35 and the length of time that the backing strip 17 is at rest, the labels 19 can be roughly positioned and spaced on the conveyor belt 35.

In fact, if it is desired to employ very accurate controls, the timing of the continuous movement of the conveyor belt 35 and the intermittent movement of the backing strip 17 would alone be sufficient to properly space and position the labels 19 on the conveyor belt 35. However, in the embodiment illustrated, this only provides rough positioning of the label 19 on the conveyor belt 35.

Fine or accurate positioning of the labels 19 is provided for by three pairs of stops in the form of pins 73, 75, and 77. Each of the pins 73, 75, and 77 is adapted to project through a slot 79 in the plate 61 and through one of the slots 51. Each of the pins 73, 75, and 77 is movable between an extended or actuated position in which it projects into the path of movement of the labels 19 on the conveyor belt 35 and a retracted or unretracted position in which it is out of the path of movement of the labels 19 on the conveyor belt 35. Although this motion of the pins can be brought about in different ways, in the embodiment illustrated it is accomplished by air cylinders 81, one of which is provided for each of the pins. The pins are carried by the cylinders 81, respectively. The air cylinders 81 are mounted in groups of two on L-shaped brackets 83 which are in turn suitably mounted on the back wall 66. The brackets 83 are preferably mounted to allow the position of the brackets, the cylinders 81, and the associated pins to be adjusted. This can be accomplished, for example, by a slot 85 in each of the brackets 83 and suitable threaded fasteners 87. The slots 79 in the plate 61 allow the pins 73, 75 and 77 to be moved.

The air cylinders 81 are double acting. Although the air cylinders can be controlled in different ways, in the embodiment illustrated, each of them receives air under pressure from a four-way valve 89 to simultaneously move the pins 73, 75, and 77 between the extended and retracted positions. As each of the pins is individually controlled by one of the cylinders 81, the pins can be extended and retracted according to any desired program.

In operation of the label applicator 11, the drive rollers 25 (FIG. 1) operate intermittently to intermittently move the backing strip 11 over the peeling bar 29. During each period of intermittent motion, the peeling bar 29 removes one of the labels 19 from the backing strip 17 and deposits such removed label at a depositing station at the left end (as viewed in FIG. 3) of the exterior belt surface 55 of the conveyor belt 35. The differential pressure created by the suction force from the vacuum pump 33 acts through the apertures 63 and the slots 51 to hold each of the labels 19 deposited on the belt 35 against the exterior belt surface 55. The belt 35 is driven by the motor 60 through the clutch and brake 62 to advance each of the labels 19 deposited thereon away from the depositing station and along a label path. The pins 73, 75 and 77 are in the retracted position so they do not interfere with movement of the labels 19 along the conveyor belt 35.

After the first label 19 is deposited on the conveyor belt 35, the drive rollers 25 stop the backing strip 17 for a predetermined period of time to allow the first label 19 to advance away from the depositing station. At the end of this predetermined period, the drive rollers 25 are started to move the backing strip 17 to deposit a second label 19 on the belt 35. The operation described above is repeated to deposit a third label on the conveyor belt 35. The intermittent movement of the backing strip 17 and the continuous movement of the belt 35 are synchronized and controlled to roughly space the three labels 19 on the belt 35. This results in the labels 19 on the belt 35 being spaced further apart than when the labels were in the backing strip. The conveyor belt 35 advances the three labels 19 toward their final positions on the belt 35, i.e. the positions from which these labels will be removed from the belt.

Prior to the time that the labels 19 reach their final positions and after the second label 19 has passed by the axis of the pins 73, the air cylinders 81 are actuated by the four-way valve 89 to move the pins 73, 75, and 77 to the extended position shown in FIG. 4. The manner in which the four-way valve 89 may be caused to actuate the cylinder 81 at the proper time will be apparent to those skilled in the art and may be accomplished in a variety of ways. For example, the valve 89 may actuate the cylinders 81 a predetermined period of time after any event in the cycle of operation, such as a predetermined time after the first label 19 is deposited on the belt 35. Alternatively, the valve 89 can actuate the cylinders 81 a predetermined period of time after the third label 19 is deposited on the belt 35.

The pins are moved simultaneously to the extended position, and ultimately the first, second and third labels contact the pins 77, 75 and 73, respectively, whereupon movement of the labels along the conveyor belt 35 is arrested. The belt 35 continues to move for a short period after movement of the three labels 19 is terminated, and the belt and labels slip relative to each other. The clutch and brake 62 may be appropriately automatically controlled so that a predetermined period after the valve 89 causes the pins 73–77 to move to the extended position, the clutch is disengaged and the brake is engaged to stop the belt 51 while allowing the motor 60 to continue running. The belt 51 moves continuously in the sense that its movement is continuous from prior to the time that the first of the labels 19 is deposited thereon until all three labels are correctly positioned. A predetermined period after the belt 51 stops, the valve 89 is operated to cause the cylinders 81 to simultaneously retract the pins 73–77.

When the conveyor 37 brings the three articles 45 beneath the labels 19 on the belt 35, a product signal from a photocell, or other means known in the label applicating art, is provided in accordance with conventional practice. Appropriate control logic, the nature of which is apparent to those skilled in the art, is responsive to the product signal to open the valve 47 to provide a blast of air through the manifolds 65, the tubes 69 and 71, the apertures 63, and the slots 51 of sufficient force to simultaneously blow the three labels 19 from the conveyor belt 35 and onto the articles 45, respectively, to adhesively attach the labels to the articles. The labels 19 can be blown off of the belt 35 according to any program desired.

The drive rollers 25 are driven intermittently in accordance with a predetermined timed program to deposit the three labels on the belt 35 and then stop. This timed program is repeated following each opening of the valve 47 to deposit three additional labels 19 on the belt 35. Similarly, the clutch of the clutch and brake unit 62 is engaged and the brake of that unit is disengaged a predetermined interval after the valve 47 opens to restart the belt 35. The sequencing of these functions, as well as the other control functions described herein can be readily implemented, either automatically or manually, by those skilled in the art.

Although an exemplary embodiment of the invention has been shown and described, many changes, modifications and substitutions may be made by those with ordinary skill in the art without necessarily departing from the spirit and scope of this invention.

We claim:

1. A method of labeling articles comprising:

moving a plurality of labels arranged in a row along a label path at a labeling station with the axes of the row and the label path being generally parallel;

transporting articles nonparallel to the label path through the labeling station with the articles forming a column of articles at the labeling station and with the axis of the column being generally parallel to the axes of the row and the label path;

carrying out said steps of moving and transporting until the labels of the row are in registry with the column of the articles at the labeling station;

transferring the labels of said row to the articles of said column; and said step of moving includes providing a movable conveyor and using the conveyor to move the row of labels along the label path, and said method includes providing a single row of labels on a backing strip, removing the labels from the backing strip, transferring the labels to the conveyor, and spacing the labels on the conveyor further apart than the labels on the backing strip.

2. A method as defined in claim 1 wherein said step of spacing includes synchronizing the movement of the conveyor and the transferring of the labels to the conveyor to provide roughly the desired space between adjacent labels on the conveyor and stopping the labels at predetermined positions along the conveyor to provide said desired space more accurately.

3. A method of labeling articles comprising:

depositing labels on a conveyor surface;

moving the conveyor surface unidirectionally through the labeling station to thereby move the labels along a substantially unidirectional label path at the labeling station with the labels being arranged in a row and with the axes of the row and the label path being generally parallel;

transporting articles nonparallel to the label path through the labeling station with the articles forming a column of articles at the labeling station and with the axis of the column being generally parallel to the axes of the row and the label path;

carrying out said steps of moving and transporting until the labels of the row are in registry with the column of the articles at the labeling station; and transferring the labels of said row to the articles of said column.

4. A method as defined in claim 3 wherein said method includes providing a label feeding device for depositing labels on said conveyor surface operating said feeding device intermittently to sequentially deposit a first group of labels on the conveyor surface, and wherein said step of moving includes running said conveyor continuously at least during the period that the first group of labels is deposited thereon.

5. A label applicator comprising:

a conveyor belt having first and second belt surfaces and opening means extending between said belt surfaces;

means for moving said belt for movement;

means for moving the belt;

means for depositing a label on the first belt surface of the belt at a first station;

means for applying a differential fluid pressure to the label on the belt for retaining the label on the first belt surface whereby the label can be retained on the belt as the belt moves; and means for blowing air under pressure through said opening means to transfer the label from the belt at a second station to at least one object.

6. A label applicator as defined in claim 5 wherein said depositing means includes a peeling bar, means for mounting said peeling bar closely adjacent said conveyor belt, and means for passing a backing strip having a row of labels thereon over said peeling bar.

7. The applicator of claim 5 including first means at said second station for engaging the label and restraining it from going past a predetermined position at least while said belt continues to move.

8. The applicator of claim 7 wherein said conveyor belt is endless and surrounds at least a portion of the first means.

9. The applicator of claim 7 wherein said conveyor belt comprises a plurality of spaced parallel strips at least partially defining said opening means therebetween and wherein said first means includes a shop movable between first and second positions, said stop in said first position extending intermediate said strips into the path of travel of said label and in said second position being ineffective to limit the travel of said label.

10. The applicator of claim 5 wherein said conveyor belt comprises a plurality of spaced parallel strips at least partially defining said opening means therebetween.

11. The applicator of claim 5 wherein said depositing means deposits a set of n labels seriatim on said first belt surface, and said blowing means is effective to transfer said set of n labels substantially simultaneously from said belt to a plurality of objects.

12. The applicator of claim 11 additionally including means for engaging at least some of said labels of said set and retraining them from going past predetermined positions, respectively, while said belt continues to move.

13. A label applicator comprising:

conveying means to move labels along a label path away from a depositing station;

means for depositing labels on said conveying means at said depositing station;

said conveying means including first means for holding labels on said conveying means but permitting the labels on the conveying means to be shifted in position therealong;

second means for engaging at least a first of the labels on the conveying means and restraining it from going past a first position on the label path at least while said conveying means continues to move;

second means for engaging at least a second of the labels on the conveying means and restraining it from going past a second position on the label path at least while said conveying means continues to move, at least one of first and second positions being spaced from the depositing station; and means for separating the first and second labels from said conveying means.

14. The applicator of claim 13 wherein said conveying means comprises a conveyor belt having air passages extending opposite first and second surfaces thereof, said first means includes means for applying suction to said air passages, to hold labels thereon while permitting said labels to be shifted in position therealong, and said separating means comprises means for blowing air under pressure through at least some of said passages to cause separation of said labels from said belt.

15. The applicator of claim 13 wherein said second means comprises at least one pin movable between an actuated position in which said pin extends into the label path at said first position to restrain the first label and an unactuated position in which the pin is out of the label path and is ineffective to restrain the first label at the first position.

16. The applicator of claim 15 wherein said conveying means comprises a plurality of spaced parallel conveyor belts, and said pin in said actuated position extends through the space between an adjacent pair of said belts into the label path.

17. A label applicator for applying labels to articles wherein the articles travel in multiple rows through a labeling station in a first direction with the articles forming at least one set of articles at the labeling station, said label applicator comprising:

a supporting structure;

conveying means for conveying labels in a row along a label path at the labeling station, the axes of said row and said label path being angularly related to the first direction whereby the labels can be brought into registry with the set of articles at the labeling station;

means for transferring the labels from said conveying means to said set of articles at the labeling station; and said conveying means including means for sequentially feeding a plurality of labels on a backing strip to a depositing station, a conveyor movable past said depositing station, means for transferring said labels at said depositing station from said backing strip to said conveyor, and means for synchronizing said feeding means and said conveyor to cause the spacing of said labels on said conveyor to differ from the spacing of labels on said backing strip.

18. The applicator of claim 13 additionally including spacing control means on said supporting structure engageable with said labels on said conveyor and causing at least some of said labels to move relative to said conveyor so as to assume accurately a predetermined spacing therealong.

19. The applicator of claim 18 wherein said spacing control means comprises a plurality of pins mounted on said supporting structure and movable between an actuated position and an unactuated position, said pins in said actuated position extending into the label path at spaced intervals and being effective to limit travel of said labels with said conveyor, said pins in said unactuated position being ineffective to limit travel of said labels with said conveyor.

20. The applicator of claim 19 wherein said conveyor comprises a plurality of spaced parallel conveyor belts, and wherein said pins in said actuated position extend intermediate said belts into the travel path of said labels.

21. The applicator of claim 19 including means to actuate at least one of said pins independently of at least another of said pins.

22. A label applicator comprising:

a vacuum transport including a housing, a movable conveyor member having first and second surfaces and opening means extending between said surfaces, means for mounting said conveyor member for movement, and means for moving the conveyor member;

means for depositing labels on the first surface at a first station;

said vacuum transport including means for applying a differential fluid pressure to the labels on the conveyor member for retaining the labels on the first surface whereby the labels can be retained on the conveyor member as the conveyor member moves; and means at least partially within said housing and acting through said opening means for transferring the labels from the conveyor member to objects to be labeled.

23. A label applicator as defined in claim 22 wherein said conveyor member comprises a plurality of spaced parallel strips at least partially defining said opening means therebetween.

24. A label applicator as defining in claim 23 including means positionable between at least two of said spaced parallel strips for engaging at least one of the labels and restraining it from going past a predetermined position.

25. A label applicator as defined in claim 23 wherein said depositing means includes means for sequentially depositing a plurality of labels on the first surface at the first station, means for controlling the rate of deposit of the labels on the first surface and the speed of movement of the conveyor member to cause a predetermined spacing of the labels on the conveyor member whereby the labels on the conveyor member are spaced as desired for removal from the conveyor member and means for actuating said transferring means when the labels on the conveyor member have said predetermined spacing whereby the labels are removed from the conveyor member.

26. A label applicator for applying labels to articles wherein the articles travel in multiple rows through a labeling station in a first direction with the articles forming at least one set of articles at the labeling station, said label applicator comprising:

a supporting structure;

conveying means for conveying labels in a row along a label path at the labeling station, the axes of said row and said label path being angularly related to the first direction whereby the labels can be brought into registry with the set of articles at the labeling station;

means for transferring the labels from said conveying means to said set of articles at the labeling station; and said conveyor means including a plurality of spaced parallel conveyor belts and means for applying reduced air pressure intermediate said conveyor belts to retain the labels on the conveyor belts.

27. A label applicator for applying labels to articles wherein the articles travel in multiple rows through a labeling station in a first direction with the articles forming at least one set of articles at the labeling station, said label applicator comprising:

a supporting structure;

conveying means for conveying labels in a row along a label path at the labeling station, the axes of said row and said label path being angularly related to the first direction whereby the labels can be brought into registry with the set of articles at the labeling station;

means for transferring the labels from said conveying means to said set of articles at the labeling station; and said conveying means including a conveyor belt extending between first and second stations, said conveyor belt having air passages extending between opposite first and second conveyor surfaces thereof, means for moving said conveyor belt between said first and second stations, means for applying labels to said first conveyor surface at said first station, and means for applying suction to at least a first of said air passages, thereby to enable said conveyor to transport said labels from said first station to said second station, and wherein said transferring means comprises means for blowing air under pressure through at least one of said air passages to cause the labels to be forcibly transferred from said conveyor belt to said set of articles.

* * * * *